US010243903B2

United States Patent
DeLuca et al.

(10) Patent No.: US 10,243,903 B2
(45) Date of Patent: Mar. 26, 2019

(54) SIMILAR CONTENT ALERT TO REDUCE DUPLICATE ELECTRONIC COMMUNICATION

(71) Applicant: INTERNATIONAL BUSINESS MACHINES CORPORATION, Armonk, NY (US)

(72) Inventors: Lisa Seacat DeLuca, Baltimore, MD (US); Jenny S. Li, Danbury, CT (US); Dana L. Price, Surf City, NC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/185,071

(22) Filed: Jun. 17, 2016

(65) Prior Publication Data

US 2017/0366491 A1 Dec. 21, 2017

(51) Int. Cl.
 H04L 15/16 (2006.01)
 H04L 12/58 (2006.01)
 H04L 29/08 (2006.01)

(52) U.S. Cl.
 CPC .............. *H04L 51/12* (2013.01); *H04L 51/32* (2013.01); *H04L 51/34* (2013.01); *H04L 67/02* (2013.01); *H04L 67/10* (2013.01)

(58) Field of Classification Search
 CPC ......... H04L 51/12; H04L 51/32; H04L 67/10; H04L 67/02; H04L 51/34
 USPC .................................................. 709/204–207
 See application file for complete search history.

(56) References Cited

U.S. PATENT DOCUMENTS

| 8,255,472 B2 * | 8/2012 | MacBeth ................ H04L 51/34 709/206 |
| 8,275,842 B2 | 9/2012 | Ngan |
| 8,473,443 B2 | 6/2013 | Lewis et al. |
| 8,515,894 B2 | 8/2013 | Yu |
| 8,572,187 B2 | 10/2013 | Garza et al. |

(Continued)

OTHER PUBLICATIONS

Kim et al., "Social Contents Sharing Model and System Based on User Location and Social Network", 2013 IEEE Third International Conference on Consumer Electronics—Berlin (ICCE—Berlin), Sep. 9-11, 2013, pp. 314-318.

(Continued)

*Primary Examiner* — Bharat Barot
(74) *Attorney, Agent, or Firm* — Michael O'Keefe

(57) ABSTRACT

Receiving, by a computer, a message from a sender to transmit to one or more recipients, comparing, by a computer, the message to a previous message transmitted to the one or more recipients, wherein the previous message is stored in a memory, determining, by the computer, that the message has a content similarity above a predetermined threshold to the previous message transmitted to one of the one or more recipients, providing, by the computer, the sender an option to prevent the message from being transmitted to one of the one or more recipients, and cancelling, by the computer, the message transmission, as a result of both the determination that the message has content similarity above the predetermined threshold, and as a result of the sender providing confirmation to prevent the message from being transmitted, and notifying, by the computer, the sender that the message transmission has been cancelled.

20 Claims, 6 Drawing Sheets

(56) References Cited

U.S. PATENT DOCUMENTS

| | | | |
|---|---|---|---|
| 8,631,077 B2 | 1/2014 | Chen et al. | |
| 8,799,236 B1 | 8/2014 | Azari et al. | |
| 8,903,838 B2 | 12/2014 | Hunter et al. | |
| 9,104,687 B2 | 8/2015 | Euresti et al. | |
| 9,191,291 B2 | 11/2015 | Doan | |
| 2005/0188033 A1* | 8/2005 | Aas | H04M 3/533 709/206 |
| 2009/0307313 A1* | 12/2009 | Wang | G06F 15/16 709/206 |
| 2010/0138444 A1* | 6/2010 | Logue | H04L 51/12 709/206 |
| 2012/0084375 A1* | 4/2012 | Haskins | H04L 51/12 709/206 |
| 2014/0270530 A1 | 9/2014 | Dwan et al. | |
| 2015/0154497 A1 | 6/2015 | Braziunas et al. | |
| 2015/0341304 A1 | 11/2015 | Sherman et al. | |
| 2015/0347996 A1 | 12/2015 | Alsina et al. | |
| 2016/0269333 A1* | 9/2016 | Kumar | H04L 51/32 |
| 2017/0118183 A1* | 4/2017 | Shin | H04L 63/123 |

OTHER PUBLICATIONS

Wu et al., "CGSharing: Efficient Content Sharing in GPU-Based Cloud Gaming", ISPLED, 2015 IEEE/ACM International Symposium on Low Power Electronics and Design, Jul. 22-24, 2015, pp. 171-176.

Mell et al., "The NIST Definition of Cloud Computing", National Institute of Standards and Technology, Special Publication 800-145, Recommendations of the National Institute of Standards and Technology, Sep. 2011, 7 pages.

\* cited by examiner

SIMILAR CONTENT ALERT TO REDUCE DUPLICATE ELECTRONIC COMMUNICATION

BACKGROUND

The present invention relates generally to a method, system, and computer program product for electronic communication, and more particularly to a method, system, and computer program product for reducing duplication of information sent via electronic communication.

An interesting news item or a communication may be shared electronically though email and social media. Often the same news item may be shared repeatedly and may cause frustration as the same news item may be received multiple times in an email inbox, in a newsfeed, via a social media platform, through an instant messaging client, through an Internet Relay Chat protocol (IRC) channel, or a business or social network. Different forms of social media where a news item may be shared include blogs, business networks, social networks, social gaming, social bookmarking, photo sharing, product review, services review, and virtual worlds. Someone who is planning to distribute a news item may not be aware that their email contacts, members of a social media group, nor their social media contacts have already been exposed to the news item.

SUMMARY

Embodiments of the present invention disclose a method, computer program product, and system for receiving, by a computer, a message from a sender to transmit to one or more recipients, comparing, by a computer, the message to a previous message transmitted to the one or more recipients, wherein the previous message is stored in a memory, determining, by the computer, that the message has a content similarity above a predetermined threshold to the previous message transmitted to one of the one or more recipients, providing, by the computer, the sender an option to prevent the message from being transmitted to one of the one or more recipients, and cancelling, by the computer, the message transmission, as a result of both the determination that the message has content similarity above the predetermined threshold, and as a result of the sender providing confirmation to prevent the message from being transmitted, and notifying, by the computer, the sender that the message transmission has been cancelled.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention generally relates to reducing duplication of information sent via electronic communication. One way to reducing duplication of information sent via electronic communication is to notify a sender of a message a likelihood that a recipient has already been exposed to the content of the message. An embodiment by which to notify the sender the likelihood that the recipient has already been exposed to the content of the message is described in detail below by referring to the accompanying drawings in FIGS. 1 to 4. Those skilled in the art will readily appreciate that the detailed description given herein with respect to these figures is for explanatory purposes as the invention extends beyond these limited embodiments.

Figure 1:
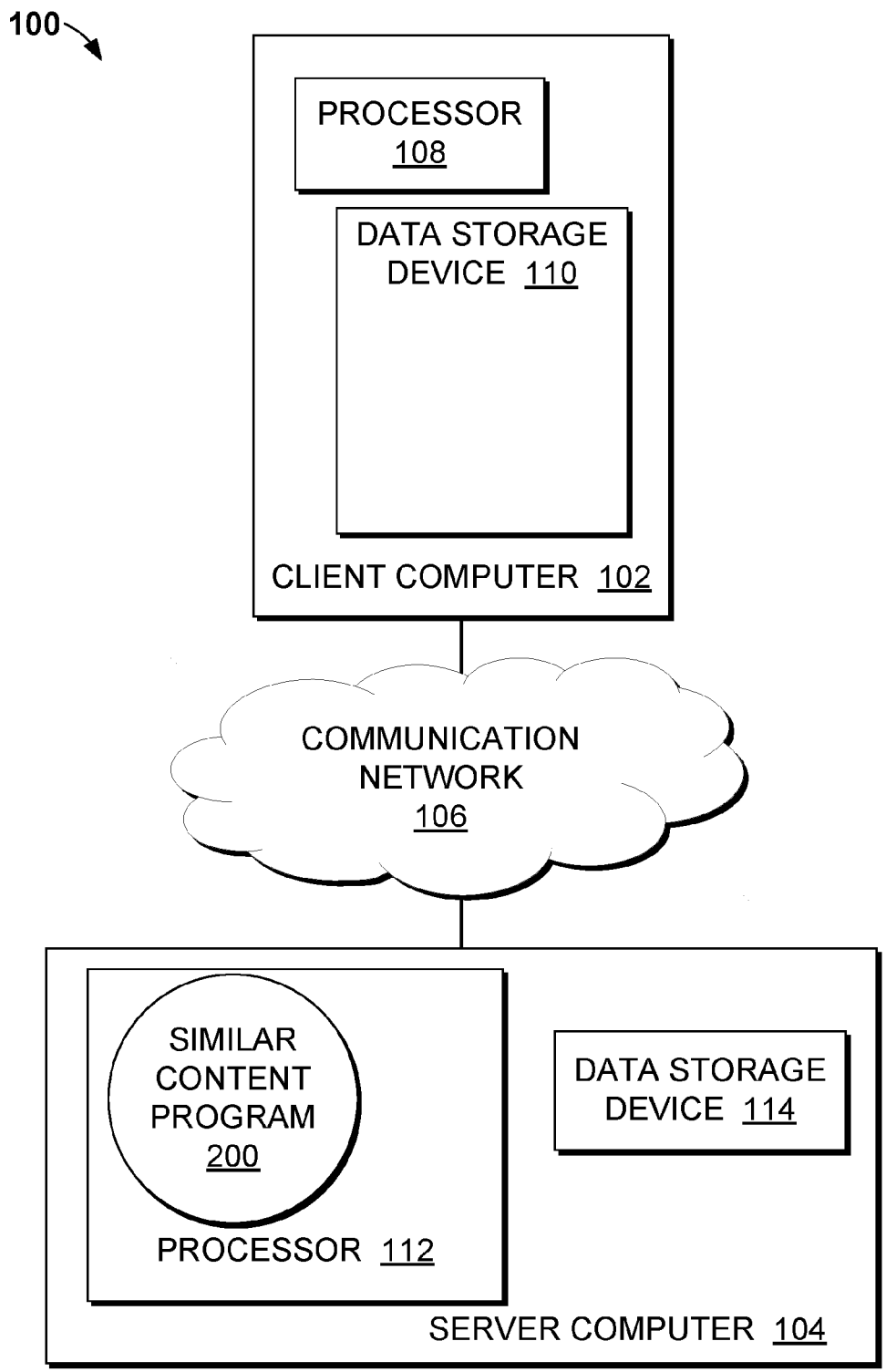
FIG. 1 is a functional block diagram illustrating a distributed data processing environment, in accordance with an embodiment of the present invention.

Referring now to FIG. 1, a functional block diagram illustrating a system 100 in a networked computer environment, in accordance with an embodiment of the present invention, is shown. The system 100 may include a client computer 102 and a server computer 104. The client computer 102 may communicate with the server computer 104 via a communications network 106 (hereinafter "network"). The client computer 102 may include a processor 108, a data storage device 110, and is enabled to interface with a user and communicate with the server computer 104. The server computer 104 may also include a processor 112 and a data storage device 114 that is enabled to run a similar content program 200. In an embodiment, the client computer 102 may operate as an input device including a user interface while the similar content program 200 may run primarily on the server computer 104. In an alternative embodiment, the similar content program 200 may run primarily on the client computer 102 while the server computer 104 may be used for processing a storage of data used by the similar content program 200.

It should be noted, however, that processing for the similar content program 200 may, in some instances be shared amongst the client computer 102 and the server computer 104 in any ratio. In another embodiment, the similar content program 200 may operate on more than one server computer 104, client computer 102, or some combination of server computers 104 and client computers 102, for example, a plurality of client computers 102 communicating across the network 106 with a single server computer 104.

The network 106 may include wired connections, wireless connections, fiber optic connections, or some combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, or any programmable electronic device capable of communicating with the server computer 104 via the network 106. As described below with reference to FIG. 4, the client computer 102 and the server computer 104 may each include internal and external components. In other embodiments, the server computer 104 may be implemented in a cloud computing environment, for example, cloud computing nodes 510, as described in relation to FIGS. 5 and 6 below. Similarly, the client computer 102 may be implemented in the cloud computing environment, for example, laptop computer 540C as shown in FIG. 5.

In an embodiment, the system 100 may include any number of client computers 102 and/or server computers 104; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

The system 100 may be generally configured to perform actions to reduce duplication of news items or information sent via electronic communication.

The similar content program 200, (hereinafter "program"), and associated methods are described and explained in further detail below with reference to FIGS. 2-6.

A sender may compose a message which they may send or share to a recipient via e-mail, instant messaging, short message service, a social networking or media platform such as Facebook™, Twitter®, LinkedIn®, or Instagram®, a cloud based collaboration tool such as slack, internet relay chat (iRC), a message board, a blog, a web page, a web site, a text, an on-line forum, Skype™, Google Voice™, other voice over internet protocol (VoIP), among other methods of electronic communication. The recipient may receive an email, or an instant message. The recipient may be a subscriber or member of a social media group, and be able to see the message or posts on the social media platform or on the cloud based collaboration tool, or the like. The message may include information and a recipient. The recipient may have a message box which contains messages. The message box may include an inbox, a folder, a sent box, a delete box, among other boxes. The cloud based collaboration tool may have an information screen which may contain postings by other members of the cloud based collaboration tool.

A newsfeed is an electronic transmission of news which may be personalized to a subscriber or a recipient in social networking or media platform. The subscriber or recipient may pre-select news topics in the newsfeed by subscribing to an internet site or by following an organization or a person. New items in the newsfeed may be posted by the organization or the person, by the subscriber, or by other methods.

The program 200 may be run by a service provider of the method of electronic communication. Alternatively, the similar content program 200 may be run by the sender.

The sender may attempt to send or share the message with a group of specific recipients. The program 200 may identify subset A group of the group of specific recipients whom have not been exposed to the information in the message, and subset B group of the group of specific recipients whom have been exposed to the information in the message. The program 200 may provide an option to continue with sending, transmitting, or sharing the message to subset A group, and to cancel sending, transmitting, or sharing the message with the subset B group, or to edit the message, for example, adding a note such as "I know you've already seen this, but I wanted to emphasize why you should read it carefully".

There may be an individual preference set by the sender to determine if the program 200 is to be sent in a certain communication environment. The individual preference set by a user or sender may be a programmable threshold of a percentage of the group of recipients who have been exposed to the information in the message, where if greater than, for example, 25%, have already been exposed to the information in the message, than the message send is cancelled.

In an alternate embodiment, the program 200 may be used by the recipient to screen incoming email or their newsfeed in a social media platform. The screening of incoming messages may be performed as described above and the recipient may have settings, for example, to delete a duplicate incoming message, file the message in a duplicate folder or not display a duplicate item in their newsfeed. A message may be automatically sent to the sender that the information in the message is a duplicate to previous information sent to or seen by the recipient and the message has been deleted.

Figure 2:
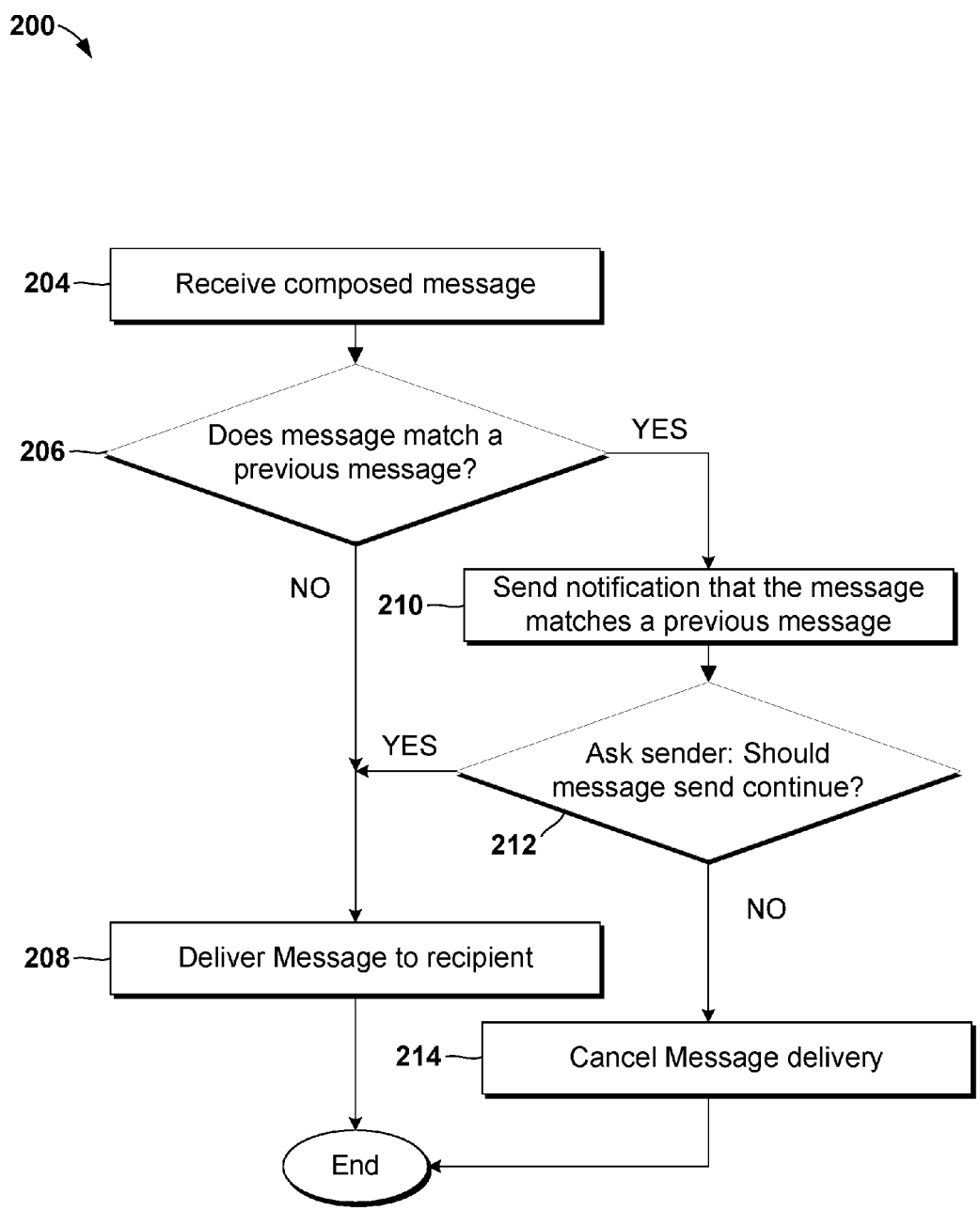
FIG. 2 is a flowchart depicting operational steps of a similar content program within the data processing environment of FIG. 1, in accordance with an embodiment of the present invention.

Referring now to FIG. 2, and with continued reference to FIG. 1, a simplified diagram of a similar content program 200 is shown in accordance with an embodiment of the present invention. The similar content program 200 may be configured to perform screening of messages to be sent or shared, where a duplicate message can be prevented from sending or sharing.

FIG. 2 is a flowchart depicting operational steps of similar content program, (hereinafter "program"), 200 for reducing duplication of information sent via electronic communication, in accordance with an embodiment of the present invention.

A composed message may be received, at step 204. The message may be received by a computer, for example the server computer 104 as shown in FIG. 1. The message may be a forwarded or copied message. The message may contain words such as a statement or question, a photo, a video, an image, an attachment, an internet web page address, a forwarded or copied message, a news item, communication, correspondence, or any combination of these things and related items. The message may be a link to a webpage or a URL. The message may be intended to be sent via e-mail, or a posting or other method of sharing information electronically. In an example, the sender may push a button to send the message to a recipient. The message may be intended for a specific recipient, a group of specific recipients or for a general social media feed, where a set of followers of the general social media feed would be exposed to the information in the message. Alternatively, the sender may push a button to post the message on a social media platform which may be visible to social media subscribers (hereinafter "subscribers") who are either contacts of the sender or followers of the sender or have visibility to postings by the sender.

The program 200 may determine if the information in the message has previously been sent to the recipient, or that the recipient has been exposed to the information, at step 206. The program 200 may also determine if a previous message has been opened or not by the recipient. The determination that the information in the message has been previously transmitted to the recipient may be determined by a computer, for example, the server computer 104 as shown in FIG. 1. If there is more than one recipient, the program 200 may check if each of the more than one recipients have previously been exposed to the information. In an embodiment, the program 200 may compare content or information of the message with content of email of the recipient. The email may include an inbox, folders and deleted emails for searching. A match or duplication may be determined as a content threshold which identifies a percentage of content or information which is similar between the message and content of one or more emails of the recipient. The contact threshold percentage may be set by an administrator of the program 200 or a user of the program 200 and may be changed. For example, the content threshold may be 75%, where if the percentage of content or information which is similar between the message and content of one or more emails of the recipient is 75% or greater, then the message is considered a match and a determination is made that the recipient has been previously sent the message, or been exposed to the message. If there is more than one recipient of the message, the program 200 may identify those who have previously been sent the message or been exposed to it on a social media platform.

A determination of whether a recipient has previously seen or been exposed to the information in the message, or if there is a match with a previous message of the recipient may be made using known analytics and data mining. A comparison may be made between the information or contents of the message and contents or posts of the recipients email, instant messaging history, social media news feed or platform, cloud based collaboration, among other things. The comparison may identify an exact match, for example a URL or a photograph. The comparison may identify a contextual match using natural language process and services. The comparison may identify a tag match, for example photos and videos tagged with similar tags. Alternatively, the comparison may identify a match between the information in the message with information in the recipient's web browsing history.

In an embodiment, when the sender attempts to send or share a message, the service provider may have a pop up screen appear to the sender, or another form of communication. The pop up screen may notify the sender that the information in the message, for example, a news item, has been sent to or shared with the recipient, with an option to cancel the message send or share. In an alternate embodiment, the program 200 may cancel the message send or share if the message has already been sent to or shared with the recipient, with a notification to the sender.

In an example of the program 200 for a message intended for email, the sender may attempt to send the message to both recipient A and recipient B. In this case, the program 200 may identify that recipient A has already been exposed to the information in the message and may identify that recipient B has not been exposed to the information. There may be an option to cancel sending the message to recipient A. The program 200 may compare the content of the message to emails which have been sent to the recipient, for example, in the recipient's inbox, deleted email, and any folders. There may be an option in the program 200 to compare the message content with all of the recipient's email, or to compare the message content with the open items in the recipient's mail. Information in the message may be compared with the recipient's mail, as well as contents of a web page address, and pictures, and the like.

The pop up screen may show details about the users who last shared the information in the message and a timestamp when last shared. The program 200 may show any comments related to the message from when the message was previously shared. The program 200 may also identify each intended recipient, the number of occurrences the recipient may have been exposed to the information in the message, when they were exposed to the information in the message and what platform it was available on. For example, Anne Jones was exposed to the information in the message on January 4, 12:00 pm in her email, and also on January 10, 1:00 pm in her Twitter® feed. Expanding this, the program 200 could show the recipients and a detail of each of the recipient's exposure to the information in the message. In addition, the program 200 may identify if the previous message was opened by the recipient, or not opened by the recipient, meaning the message was possibly read by the recipient, or likely not read by the recipient.

The notification could be a pop up screen with option buttons to prompt the sender to make a selection, or an alternate method of communication. The option buttons may include buttons with options to continue with the send or share of the message, cancel the send or share of the message, and edit the message prior to send or sharing. The option buttons may be provided by a computer, for example, the server computer 104 as shown in FIG. 1.

In a social media example of the program 200, the recipient of the message may be a group of recipients who are contacts of the sender, a follower of the sender, or may be part of a network group and may be able to see a news feed, for example. In this case, the program 200 may provide details of the likelihood of followers a percentage of the group of recipients, for example, 75% of followers of the general social media feed have been exposed to the message, and that the message has been shared 5 times, and that the message was first seen 20 days ago and last seen 5 days ago. The program 200 may provide an option for the sender to continue with the message share or send, or to edit the message. In an alternate embodiment, the message send or sharing may be cancelled by the service provider if information in the message has been sent or shared with a threshold percentage, for example 70%, of the group of recipients, where the threshold percentage is changeable by an administrator of the program 200. For example, if greater than 70% of the group of recipients have been sent or shared the information in the message, the message send or share is cancelled. There may be a notification to the sender that the message send or sharing has been cancelled.

In the case that the recipient has previously been exposed to the information in the message, shown as option 'YES' for the decision diamond 206 in FIG. 2, the program 200 continues to notify the sender that the recipient has previously had the message sent to them, or been exposed to the message, at step 210. The notification may be a pop up screen which provides an option for the sender to either continue with the message send, to cancel the message delivery, or to edit the message. The program 200 may send a question, such as a pop up screen, asking the sender if the message send should continue, at step 212.

In the case that the sender decides to cancel the message send, shown as option 'NO' for the decision diamond 212 in FIG. 2, the program will cancel the message delivery at step 214. In the case where there are more than one recipients of the message, there may be an option to cancel delivery of the message to those who have previously been sent the message.

In the case that the recipient has not been sent previously the information in the message, option 'NO' for the decision diamond 206, and also for the case where the sender decides to continue with the message send, option 'YES' for the decision diamond 212, the program 200 will deliver the message to the recipient, at step 208.

The program 200 has benefits for both the sender and for the recipient. The sender can avoid sending duplicate email, or the creation of duplicate postings. The recipient may have a more streamlined inbox without duplication and be able to see more unique list of messages in an inbox screen, and similarly not see duplicate posts in a new stream or newsfeed. The program 200 allows a sender of a message to have the message compared to prior messages of a recipient and can alert the sender of duplication and a likelihood that the recipient has already been exposed to the information in the message.

Figure 3:
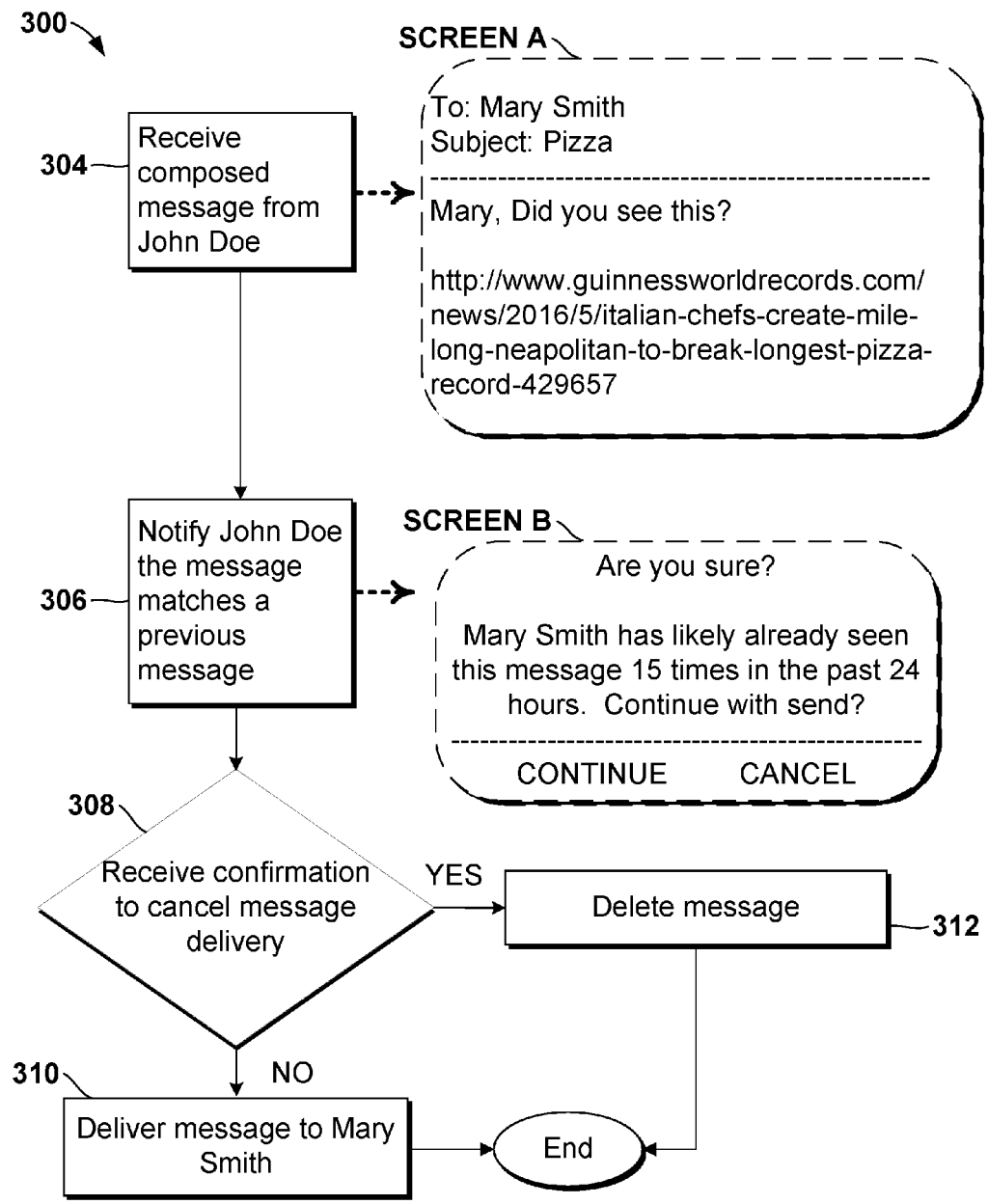
FIG. 3 is a block diagram depicting an example of the similar content program, shown in accordance with an embodiment of the present invention.

Referring now to FIG. 3, and with continued reference to FIGS. 1 and 2, an example 300 of the program 200 is shown in accordance with an embodiment of the present invention.

A composed message may be received, at step 304. The message is shown as SCREEN A and may contain a link to a webpage. John Doe may push a button to attempt to send the message to a recipient, Mary Smith, at step 304.

The program 200 may determine that Mary Smith has already been exposed to this link to the webpage and notify John Doe that the information in the message matches information in a previous message sent to Mary Smith, for example, a pop up window with selection buttons may display to John Doe, at step 306. The pop up window is shown as SCREEN B and has the information: Are you sure?

Mary Smith has likely seen this message 15 times in the past 24 hours. Continue with send? The selection buttons include CONTINUE and CANCEL.

The program 200 can receive a confirmation to cancel the message delivery, shown as option YES from the decision diamond 308. The program 200 may receive a decision to continue with the message delivery, shown as option NO from the decision diamond 308, and then the program 200 continues to delete the message at step 312.

This is an example of a type of message intended to be sent by the sender and an example of a popup screen which the program 200 may show to the sender.

Figure 4:
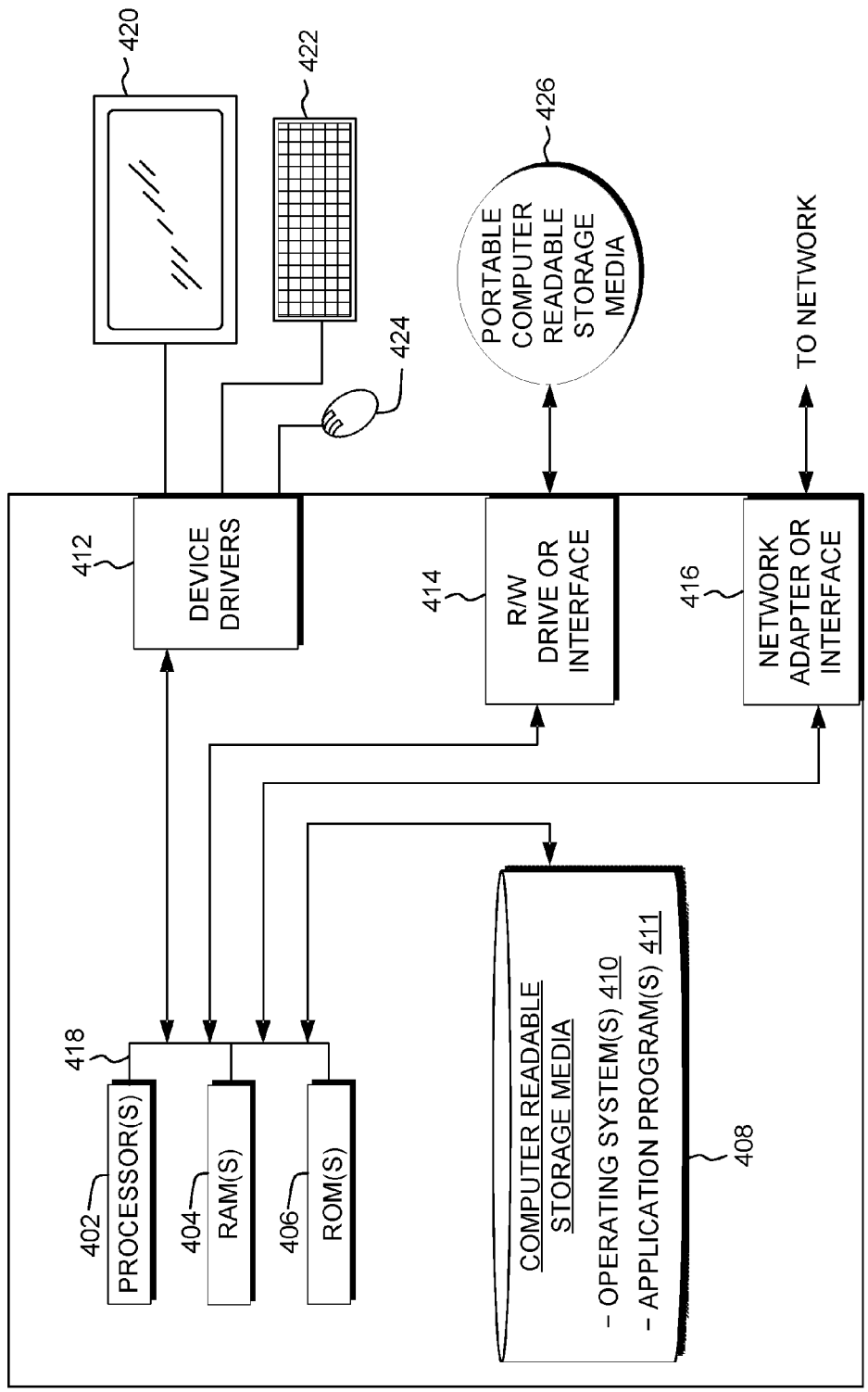
FIG. 4 is a block diagram of internal and external components of computers and servers depicted in FIG. 1, in accordance with an embodiment of the present invention.
Figure 5:
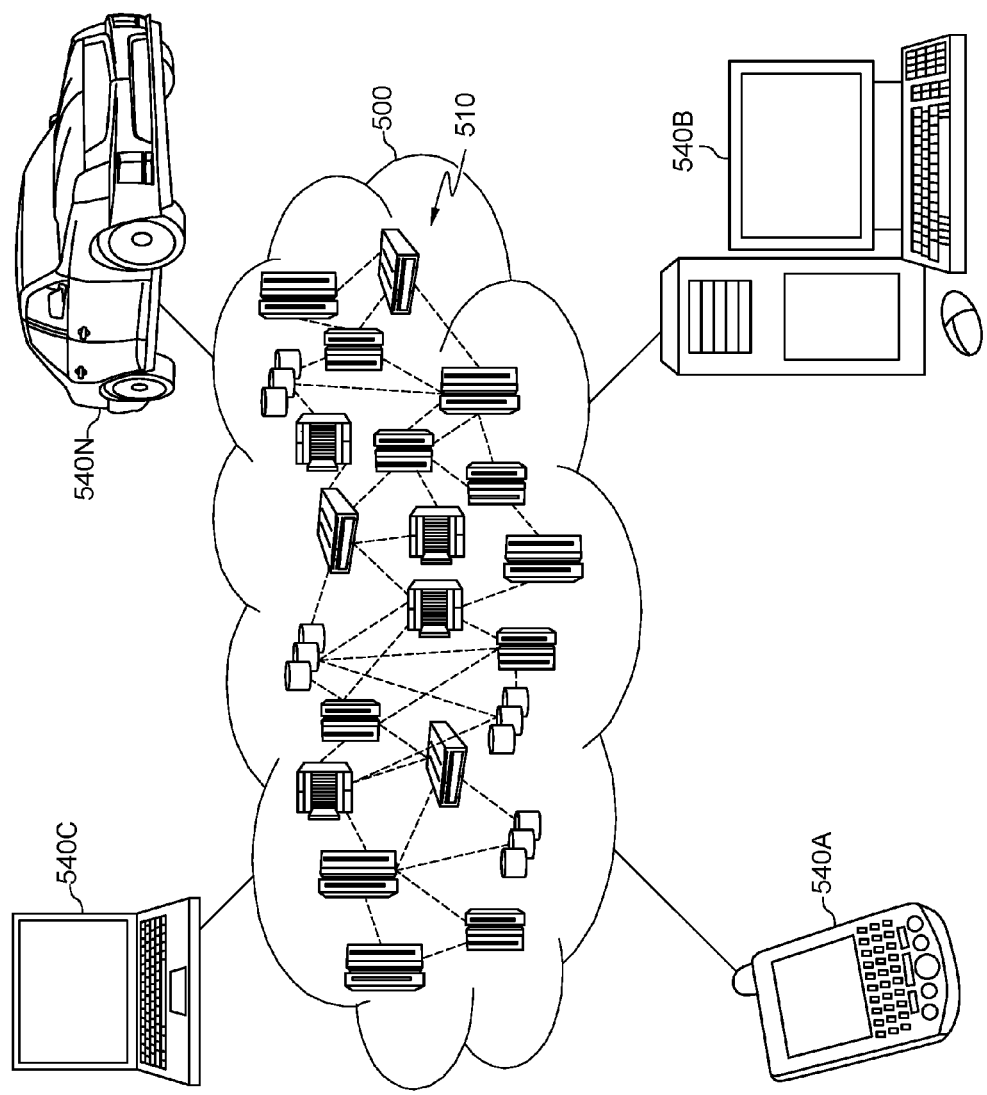
FIG. 5 is a block diagram of functional layers of an illustrative cloud computing environment, including the distributed data processing environment depicted in FIG. 1, in accordance with an embodiment of the present disclosure.

Referring now to FIG. 4, a block diagram of components of a computing device, such as the client computer 102 or the server computer 104, of the system 100 of FIG. 1, in accordance with an embodiment of the present invention is shown. It should be appreciated that FIG. 4 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, the similar content program 200, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include a R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 on the computing device may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics of cloud computing include on-demand self-service, broad network access, resource pooling, rapid elasticity, and measured service, which are each described below.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models include Software as a Service, Platform as a Service, and Infrastructure as a Service, which are each described below.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models include private cloud, community cloud, public cloud, and hybrid cloud, which are each described below.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 510 and cloud computing environment 500 can communicate with any type of computerized device over any type of network and/or network addressable connection (e.g., using a web browser).

Figure 6:
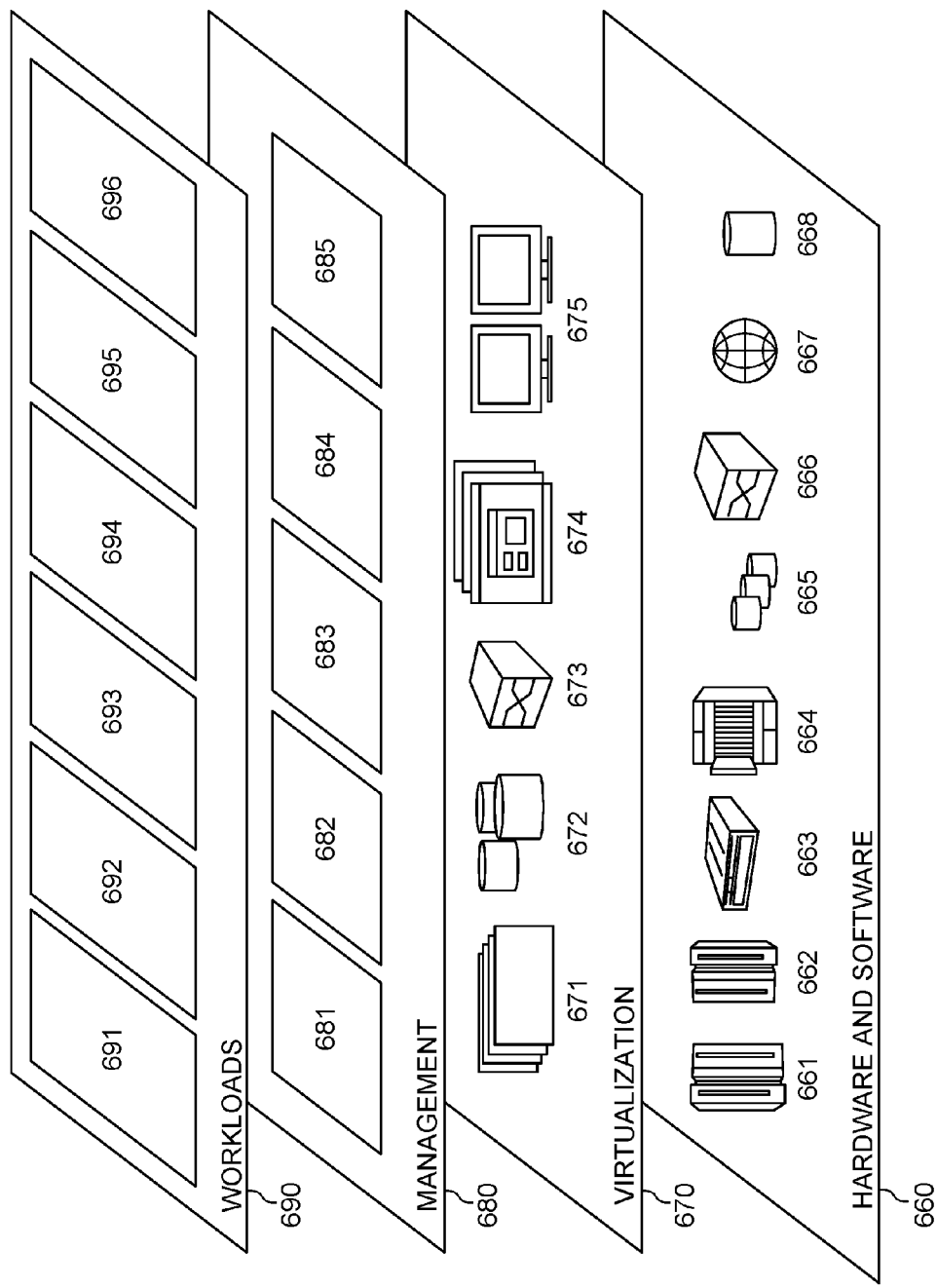
FIG. 6 is a functional block diagram of functional layers of the illustrative cloud computing environment of FIG. 5, in accordance with an embodiment of the present invention.

Referring now to FIG. 6, a set of functional abstraction layers provided by cloud computing environment 500 (as shown in FIG. 1) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 114 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and similar content program 200 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for similar content alert before sharing a message, the method comprising:
   receiving, by a computer, a message from a sender to transmit to one or more recipients;
   comparing, by the computer, the message to a previous message received by the one or more recipients, wherein the previous message is stored in a corresponding message box of the one or more recipients;
   determining, by the computer, that the message has a content similarity above a predetermined threshold to the previous message transmitted to one of the one or more recipients;
   providing, by the computer, the sender an option to prevent the message from being transmitted to one of the one or more recipients;
   receiving, by the computer, a confirmation from the sender to prevent the message from being transmitted;
   cancelling, by the computer, the message transmission, as a result of the sender providing confirmation to prevent the message from being transmitted; and
   notifying, by the computer, the sender that the message transmission has been cancelled.

2. The method of claim 1, further comprising providing, by the computer, information to the sender, the information comprising at least one of:
   a percentage of content similarity;
   a number of occurrences of messages previously received;
   a last occurrence of messages previously received;
   a timestamp of the last occurrence of messages previously received;
   a number of the one or more recipients that received a similar correspondence; and
   a number of the one or more recipients not receiving a similar message.

3. The method of claim 2, further comprising:
   prompting, by the computer, the sender to select an option, the options comprising: cancel the message, send the message, and modify the message.

4. The method of claim 1, wherein the messages previously received, by the computer, comprises: e-mail, instant messaging, short message service, social networking, media platform, cloud based collaboration, slack, a message board, a blog, a web page, a web site, and an on-line forum.

5. The method of claim 1, wherein the content similarity further comprises:
   an exact match between the message and messages previously received;
   a contextual content between the message and messages previously received;
   a tag match between the message and messages previously received;
   a URL match between a URL in the message and a URL in the messages previously received;
   a title match between the message and messages previously received; and
   a shared content match between the message and one or more recipients browsing history.

6. The method of claim 1, wherein one or more recipients comprises:
   a specific user;
   a group of specific users; and
   a general social media feed consumed by a set of followers.

7. The method of claim 1, wherein providing, by the computer, the sender with an option to prevent the message from being delivered comprises:
provides, by the computer, the sender with an option to deliver the message to a first group of the one or more recipients not receiving a similar message; and
providing, by the computer, the sender with an option to not deliver the message to a second group of the one or more recipients receiving a similar message.

8. A computer program product for similar content alert before sharing a message, the computer program product comprising:
one or more non-transitory computer-readable storage media and program instructions executable by a processor stored on the one or more non-transitory computer-readable storage media, the program instructions comprising:
program instructions to receive a message from a sender to transmit to one or more recipients;
program instructions to compare the message to a previous message received by the one or more recipients, wherein the previous message is stored in a corresponding message box of the one or more recipients;
program instructions to determine that the message has a content similarity above a predetermined threshold to a previous message transmitted to one of the one or more recipients;
program instructions to provide the sender an option to prevent the message from being transmitted to one of the one or more recipients;
program instructions to receive a confirmation from the sender to prevent the message from being transmitted;
program instructions to cancel the message transmission, as a result of the sender providing confirmation to prevent the message from being transmitted; and
program instructions to notify the sender that the message transmission has been cancelled.

9. The computer program product of claim 8, further comprising program instructions to provide information to the sender, the information comprising at least one of:
a percentage of content similarity;
a number of occurrences of messages previously received;
a last occurrence of messages previously received;
a timestamp of the last occurrence of messages previously received;
a number of the one or more recipients that received a similar correspondence; and
a number of the one or more recipients not receiving a similar message.

10. The computer program product of claim 8, further comprising:
program instructions to prompt the sender to select an option, the options comprising: cancel the message, send the message, and modify the message.

11. The computer program product of claim 8, wherein the messages previously received comprises: e-mail, instant messaging, short message service, social networking, media platform, cloud based collaboration, slack, a message board, a blog, a web page, a web site, and an on-line forum.

12. The computer program product of claim 8, wherein the content similarity further comprises:
an exact match between the message and messages previously received;
a contextual content between the message and messages previously received;
a tag match between the message and messages previously received;
a URL match between a URL in the message and a URL in the messages previously received;
a title match between the message and messages previously received; and
a shared content match between the message and one or more recipients browsing history.

13. The computer program product of claim 8, wherein one or more recipients comprises:
a specific user;
a group of specific users; and
a general social media feed consumed by a set of followers.

14. The computer program product of claim 8, wherein program instructions to provide the sender with an option to prevent the message from being delivered comprises:
program instructions to provide the sender with an option to deliver the message to a first group of the one or more recipients not receiving a similar message; and
program instructions to provide the sender with an option to not deliver the message to a second group of the one or more recipients receiving a similar message.

15. A computer system for similar content alert before sharing a message, the computer system comprising:
one or more computer processors, one or more computer-readable storage media, and program instructions stored on the one or more computer-readable storage media for execution by at least one of the one or more processors, the program instructions comprising:
program instructions to receive a message from a sender to transmit to one or more recipients;
program instructions to compare the message to a previous message received by the one or more recipients, wherein the previous message is stored in a corresponding message box of the one or more recipients;
program instructions to determine that the message has a content similarity above a predetermined threshold to a previous message transmitted to one of the one or more recipients;
program instructions to provide the sender an option to prevent the message from being transmitted to one of the one or more recipients;
program instructions to receive a confirmation from the sender to prevent the message from being transmitted;
program instructions to cancel the message transmission, as a result of the sender providing confirmation to prevent the message from being transmitted; and
program instructions to notify the sender that the message transmission has been cancelled.

16. The computer system of claim 15, further comprising program instructions to provide information to the sender, the information comprising at least one of:
a percentage of content similarity;
a number of occurrences of messages previously received;
a last occurrence of messages previously received;
a timestamp of the last occurrence of messages previously received;
a number of the one of the one or more recipients that received a similar correspondence; and
a number of the one or more recipients not receiving a similar message.

17. The computer system of claim 15, further comprising:
program instructions to prompt the sender to select an option, the options comprising: cancel the message, send the message, and modify the message.

18. The computer program product of claim 15, wherein the messages previously received comprises: e-mail, instant messaging, short message service, social networking, media platform, cloud based collaboration, slack, a message board, a blog, a web page, a web site, and an on-line forum.

19. The computer system of claim 15, wherein the content similarity further comprises:
   an exact match between the message and messages previously received;
   a contextual content between the message and messages previously received;
   a tag match between the message and messages previously received;
   a URL match between a URL in the message and a URL in the messages previously received;
   a title match between the message and messages previously received; and
   a shared content match between the message and one or more recipients browsing history.

20. The computer system of claim 15, wherein one or more recipients comprises:
   a specific user;
   a group of specific users; and
   a general social media feed consumed by a set of followers.

\* \* \* \* \*